Figure 1:
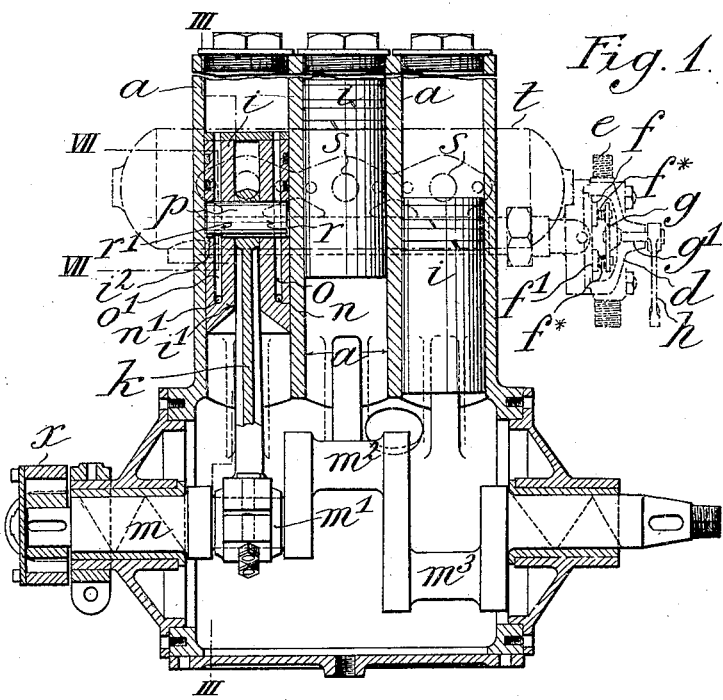

June 1, 1926.                                                              1,586,762
S. H. SHEPHERD
FLUID PRESSURE RECIPROCATING ENGINE
Filed Oct. 16, 1925          2 Sheets-Sheet 1

INVENTOR
Sydney Howard Shepherd
BY Dowell & Dowell
his ATTORNEYS

June 1, 1926. 1,586,762
S. H. SHEPHERD
FLUID PRESSURE RECIPROCATING ENGINE
Filed Oct. 16, 1925   2 Sheets-Sheet 2
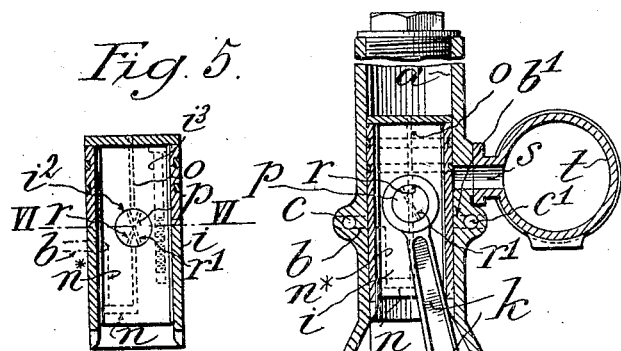
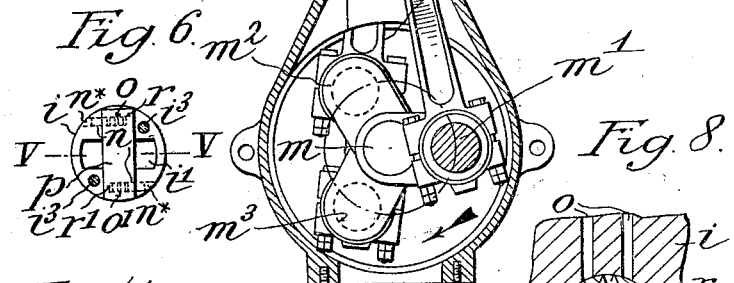
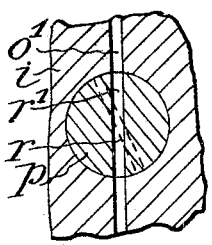
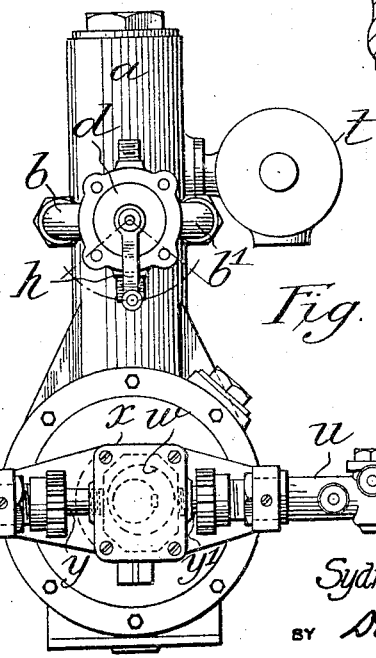
INVENTOR
Sydney Howard Shepherd
BY Dowrell & Dowrell
his ATTORNEYS Patented June 1, 1926.

1,586,762

UNITED STATES PATENT OFFICE.

SYDNEY HOWARD SHEPHERD, OF CRICKLEWOOD, LONDON, ENGLAND.

FLUID-PRESSURE RECIPROCATING ENGINE.

Application filed October 16, 1925, Serial No. 62,877, and in Great Britain May 23, 1924.

This invention has reference to single acting fluid pressure reciprocating engines of the kind wherein the piston or plunger, or each piston or plunger (hereinafter referred to as the piston) is directly jointed to a connecting rod working on to the engine crank shaft.

In engines of this kind it has been proposed to supply motive fluid to and exhaust the spent fluid from the inner end of the engine cylinder through supply and exhaust ports in the engine cylinder and one or more passages in the engine piston, the inlet and exhaust ports in the cylinder being controlled by the piston and the inlet and exhaust passage or passages in the piston being controlled by an oscillating valve operated by the angular movement of the engine connecting rod and constituted by a joint pin or member between such rod and the piston, the object of such arrangements being to avoid the use of the separate admission and exhaust valves and operating means therefor, commonly used.

The present invention has for its object to simplify the construction and improve the working of reciprocating engines of the general type referred to.

In a reciprocating engine according to the present invention, motive fluid under pressure (hereinafter referred to as steam) is admitted to the closed end of the engine cylinder through a port in the cylinder wall controlled by the piston, and through a passage extending through the piston to the end of the cylinder and is controlled by an oscillating valve constituted by an end portion of the gudgeon or joint pin connecting the piston and connecting rod. Said pin extends across and divides the passage into two parts and is provided with a transverse passage adapted to be brought into and out of communication with the two parts of the passage in the piston by its oscillation angular movement with the angular movement of the connecting rod, the spent steam being exhausted direct from the cylinder through a port formed in the cylinder wall and opened by the piston only when the same arrives at or near the end of its outward or working stroke.

Said piston gudgeon or joint is mounted to rotate in bearings formed in the piston, which in addition to being slotted in an axial direction to receive the adjacent end of the connecting rod may advantageously be divided transversely to admit of the pin being inserted in and caused to fit closely with the bearings formed in and between the adjacent parts which are afterwards secured together. The connecting rod may thus be said to be provided with trunnions jointed to the piston.

One of these trunnions, in a non-reversible engine, is arranged to extend across the steam admission passage extending through the piston and is provided with a diametrically disposed hole so positioned in relation to the engine crank shaft that it is out of alignment with the steam passage in the piston when the crank is on its dead centre corresponding to the inner end of the stroke of the piston, but will commence to open the said passage and permit steam to enter the cylinder when the crank has moved through a short predetermined angular distance, say for example 5°, past its dead centre and then gradually to further open the passage to the necessary extent, the passage being afterwards closed as the piston continues to make its working stroke. Steam may be admitted to the steam inlet port in the cylinder wall from a steam chest by a hand operated valve or regulator.

In the case of a reversible engine, the cylinder wall is provided with two steam inlet ports and the piston is provided with two steam admission passages adapted to co-operate respectively therewith. One of the trunnions has a hole therethrough adapted to co-operate with one of the steam admission passages in the piston and the other trunnion has a hole therethrough adapted to co-operate with the other steam admission passage in the piston, the two holes being inclined in opposite directions to one another. The arrangement is such that one trunnion will act to control the passage of steam through the piston to the closed inner end of the cylinder, to cause the engine to run in a forward direction, while the other trunnion will act to control the passage of steam through the other passage to cause the engine to run in a backward direction. In this case, steam is supplied separately to one or the other of the steam inlet ports in the cylinder wall by hand operated valve mechanism.

Figure 2:
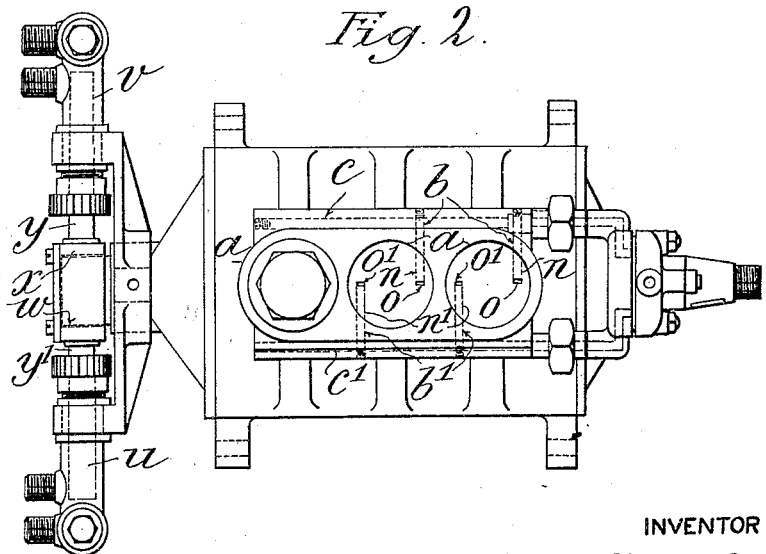

In the accompanying illustrative drawings, Fig. 1 shows partly in side elevation and partly in vertical section and Fig. 2 in plan, with parts removed, one construction of a reversible three cylinder single acting reciprocating engine embodying the invention. Fig. 3 is a section on the line III—III of Fig. 1 and Fig. 4 is an elevation of the left hand-side of such engine. Figs. 5 and 6 show one of the engine pistons separately, Fig. 5 being a section on the line V—V of Fig. 6 and Fig. 6 a plan on the line VI—VI of Fig. 5. Fig. 7 is a section corresponding to the line VII—VII of Fig. 1 but to a larger scale than that figure. Fig. 8 is a sectional view, similar to Fig. 7, but showing a modified construction.

In the example shown in Figs. 1 to 7 inclusive, each of the engine cylinders $a$ is provided with two steam inlet ports $b$ and $b^1$, the three ports $b$, designed for forward running of the engine, being connected to a steam supply conduit or passage $c$ common to them, and the inlet ports $b^1$, designed for backward running of the engine, being connected to another steam supply conduit or passage $c^1$ common to them. The two passages $c$ and $c^1$ are connected to a supply steam chest or chamber $d$ to which steam is admitted through a pipe $e$, the passage of the steam to one or other of the passages $c$ or $c^1$ being controlled by one or other of two valves $f$, $f^1$ connected to a lever $g$ carried within the steam chest $d$ by a spindle $g^1$ adapted to be operated by an external hand lever or regulator $h$. The valves $f$, $f^1$ may be so connected to the lever $g$, as by providing each of them with a pin extending into a hole in the lever $g$ and with a coiled spring $f^x$ between it and the lever that whilst they can be moved over their seats to open and close admission ports therein, communicating with the passages $c$, $c^1$, they are free to adjust themselves closely against the seats. The valves $f$, $f^1$ in addition to forming reversing valves, also form steam regulating valves to control the flow of steam to the cylinder to suit the required working conditions. In each cylinder $a$ is a piston $i$ jointed to a connecting rod $k$ working on to one of three cranks $m^1$, $m^2$, $m^3$ of the engine shaft $m$, the said cranks being arranged 120° apart. In each piston $i$ are two steam admission passages each comprising a lateral portion $n$ or $n^1$ adapted to co-operate at the required times with the steam inlet port $b$ or $b^1$ respectively in the wall of the corresponding cylinder, and a longitudinal portion $o$ or $o^1$ extending to the inner end of the piston. The piston $i$ is slotted at $i^1$ to receive the upper end of its connecting rod $k$ to which it is jointed by a gudgeon pin $p$ formed integral with or, as in the example shown, rigidly fixed to the connecting rod. The end portions of the pin form trunnions which are mounted to rock in bearings $i^2$ formed in the piston $i$ which is divided transversely (see Fig. 5) to admit of the pin being inserted in and caused to make a good fit with the bearings which are formed in and between the adjacent parts of the piston. The two parts of the piston are afterwards firmly secured together, as by screws $i^3$. One of the trunnions has a hole $r$ therethrough to co-operate with the steam admission passage $n$—$o$ in the piston and the other trunnion has a hole $r^1$ therethrough to co-operate with the other steam admission passage $n^1$—$o^1$ in the piston. The two holes $r$, $r^1$ are inclined diagonally to one another as shown in Fig. 3. One of them, namely $r$, is arranged to commence to open to the adjacent upper and lower portions of the steam passage $n$—$o$ when the corresponding crank has moved about 5° past its upper dead centre when turning in the direction of the arrow (Fig. 3) and the other hole $r^1$ is arranged to commence to open to the adjacent upper and lower portions of the passage $n^1$—$o^1$ when the said crank has moved about 5° past its upper dead centre when turning in the reverse direction, as and for the purpose hereinbefore described. The inlet end of each passage $n$, $o$ or $n^1$ $o^1$ is made of such axial length, as by arranging it in communication with an elongated recess $n^x$ in the side of the piston (Fig. 3), and each inlet port $b$, $b^1$ in the cylinder wall is made of such axial length, that sufficient steam will be supplied through such port and passage to the cylinder to meet any desired condition before being cut off. The ends of the hole $r$, or of each hole $r$, $r^1$ in the gudgeon pin $p$ and the adjacent end portions of the passage $n$, $o$ or of each passage $n$ $o$ and $n^1$, $o^1$, are preferably made of rectangular shape rather than of circular shape, to admit of them being placed in communication with one another at the required times and in the required manner by the small angular movement of the pin and to admit of the desired quantity of steam passing through them when in communication with one another. The said passage or passages and hole or holes may be of rectangular cross section throughout their length. When the crank is moving past its lower dead centre, the steam passages $n$—$o$ and $n^1$—$o^1$ are of course out of line with the steam admission ports $b$ and $b^1$. $s$ is a lateral exhaust port in the cylinder wall arranged to be uncovered by the inner end of the piston $i$ when the piston arrives at or near the end of its outward or working stroke (Fig. 3.) and through which the whole of the spent steam can exhaust, direct from the cylinder into a feed water heater $t$, common to each of the three exhaust ports or elsewhere, as may be desired.

To permit of a larger quantity of steam being admitted through the piston to the inner end of the cylinder, one end or each end of the joint pin $p$ may be provided with a number of transverse holes $r$, or $r^1$, and the piston $i$ be provided with a number of corresponding steam admission passages $n$—$o$, or $n$—$o$ and $n^1$ $o^1$, adapted to co-act with the multiple holes in the pin. Fig. 8 shows an arrangement of this kind in which the one end of the joint pin $p$ is formed with a pair of transverse holes $r$ and the piston $i$ with a corresponding pair of steam admission passages $n$—$o$ to which steam is simultaneously admitted.

As will readily be understood, the engine may comprise only one cylinder with one piston working on to one crank. Also, in either case the second steam supply conduit or passage $c^1$ with controlling valve $f^1$, the second steam admission port $b^1$ in each cylinder and the second steam passage $n^1$ or $o^1$ in each piston may be omitted when a reversible engine is not required, the engine in other respects corresponding to that hereinbefore described.

A steam engine according to the invention may advantageously be associated with a combined steam generator and superheater of the kind described in the specification of another application for U. S. Letters Patent, Serial No. 62,303, filed October 13, 1925, for improvements in or relating to the production of high pressure steam for motive purposes. In this case, the water supplied to the steam generator, and the liquid fuel used for heating the steam generator and superheater, may conveniently be supplied by reciprocating pumps $u$ and $v$ respectively, driven by an eccentric $w$ fixed on one end of the crank shaft $m$ and working in a box-head $x$ connected to the pump plungers $y$, $y^1$. Such an associated arrangement is specially suitable for use on motor road vehicles and water craft of various kinds.

The engine shown is specially adapted for use with steam or fluid at very high pressure, say of the order of one or two thousand pounds to the square inch.

What I claim is:—

1. A fluid pressure reciprocating engine, including a cylinder having separate fluid admission and exhaust ports; a working piston in said cylinder by which the exhaust port therein is uncovered upon arriving near the end of its working outstroke, said piston having a fluid supply passage leading laterally thereinto from a point in its periphery and extending longitudinally through its walls to its inner end face on a line substantially parallel with its axis and opening directly into the compression chamber of the cylinder, said passages being adapted to register with the fluid admission port of the cylinder when the piston reaches the inner end portion of its stroke and to move out of registration therewith when said piston has made a predetermined portion of its working outstroke; an oscillating joint-pin for said piston having its ends extending diametrically into the walls of the latter in a plane with the longitudinally extended portion of the supply passage therein and normally closing the same, said joint-pin being provided with a passage extending transversely therethrough and adapted by the angular movement thereof to be brought into and out of co-axial registration with said supply passage in the piston; a crank-shaft and a connecting rod fixed to said joint-pin and connected to said crank-shaft.

2. A reversible fluid pressure reciprocating engine of the type hereinbefore described, including a cylinder having separate fluid admission and exhaust ports; a working piston in said cylinder by which the exhaust port therein is uncovered when the piston arrives near the end of its working outstroke; said piston being formed with supply passages leading thereinto from points in its periphery at opposite sides thereof and extending longitudinally through its walls to its inner end face on lines substantially parallel with its axis and opening directly into the compression chamber of the cylinder said passages being adapted to register with the fluid admission ports of the cylinder when the piston reaches the inner end portion of its stroke and to move out of registration therewith when said piston has made a predetermined portion of its working outstroke; an oscillating joint-pin in said piston having its ends extending diametrically into the walls of the latter in a plane with the longitudinally extended portions of the supply passages in the sides thereof and normally closing said passages, said joint-pin being provided with passages extending transversely therethrough and adapted by angular movement thereof to be brought into and out of co-axial registration with said supply passages in the piston; a crank-shaft; a connecting rod fixed to said joint-pin and connected to said shaft; fluid supply conduits connected with the admission ports of the cylinder; a fluid supply chamber; and means for controlling the admission of fluid from said chamber to said conduits.

3. A reversible fluid pressure reciprocating engine comprising multiple cylinders; working pistons therein; joint-pins mounted to oscillate in said pistons; a multiple crank-shaft and connecting rods fixed to the joint-pins of the respective pistons and connected to the cranks of said shaft, each of said cylinders having two fluid admission ports and an exhaust port provided in its wall, the latter port being arranged to be uncovered by the piston working therein when the latter arrives near the end of its working outstroke; each of said pistons having independently controllable fluid supply passages for forward and reverse drive leading thereinto from points in the periphery at opposite sides thereof and extending longitudinally through its walls to its inner end face on lines substantially parallel with its axis and opening directly into the compression chamber of its cylinder, said passages being adapted to register with the fluid admission port of the cylinder when the piston reaches the inner end portion of its stroke and to move out of registration therewith when said piston has made a predetermined portion of its working outstroke, each of said joint-pins having its ends extending diametrically through the walls of its piston in the same plane with the longitudinally extended portions of the supply passages therein and having transverse holes therethrough adapted by the angular movement thereof to be brought into and out of co-axial registration with said passages in the piston; fluid supply conduits connected with the admission ports of the cylinders; a fluid supply chamber; valve means for controlling the supply of fluid from said chamber to said conduits independently and means for operating said valve means.

Signed at London, England, this thirtieth (30th) day of September, 1925.

SYDNEY HOWARD SHEPHERD.